H. BROUSSEAU.
PACKING.
APPLICATION FILED MAY 12, 1909.
951,175.
Patented Mar. 8, 1910.
2 SHEETS—SHEET 1.
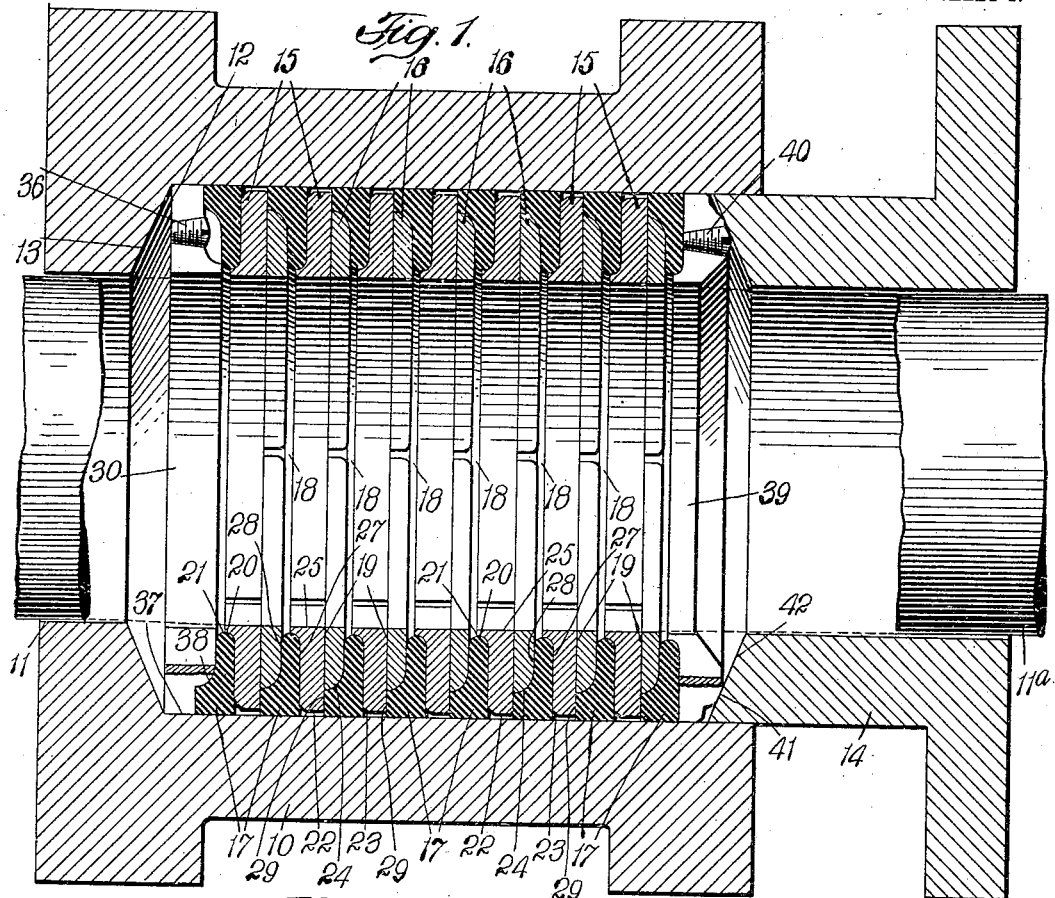
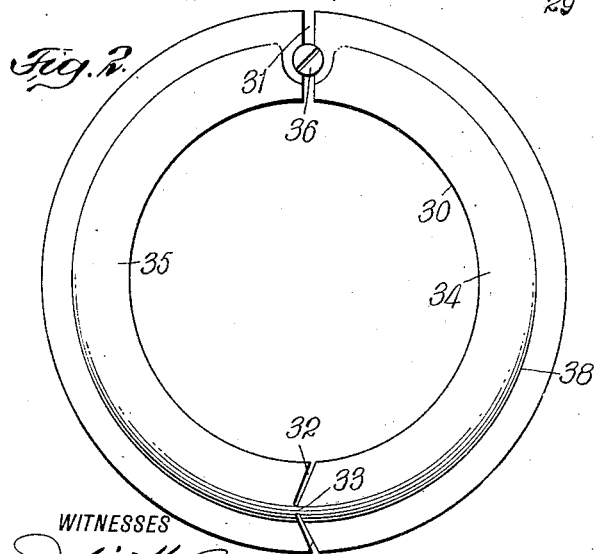
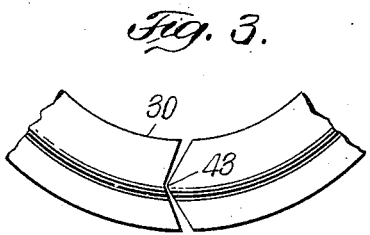
WITNESSES
INVENTOR
Harry Brousseau
BY
Criswell & Criswell
ATTORNEYS H. BROUSSEAU.
PACKING.
APPLICATION FILED MAY 12, 1909.
951,175.
Patented Mar. 8, 1910.
2 SHEETS—SHEET 2.
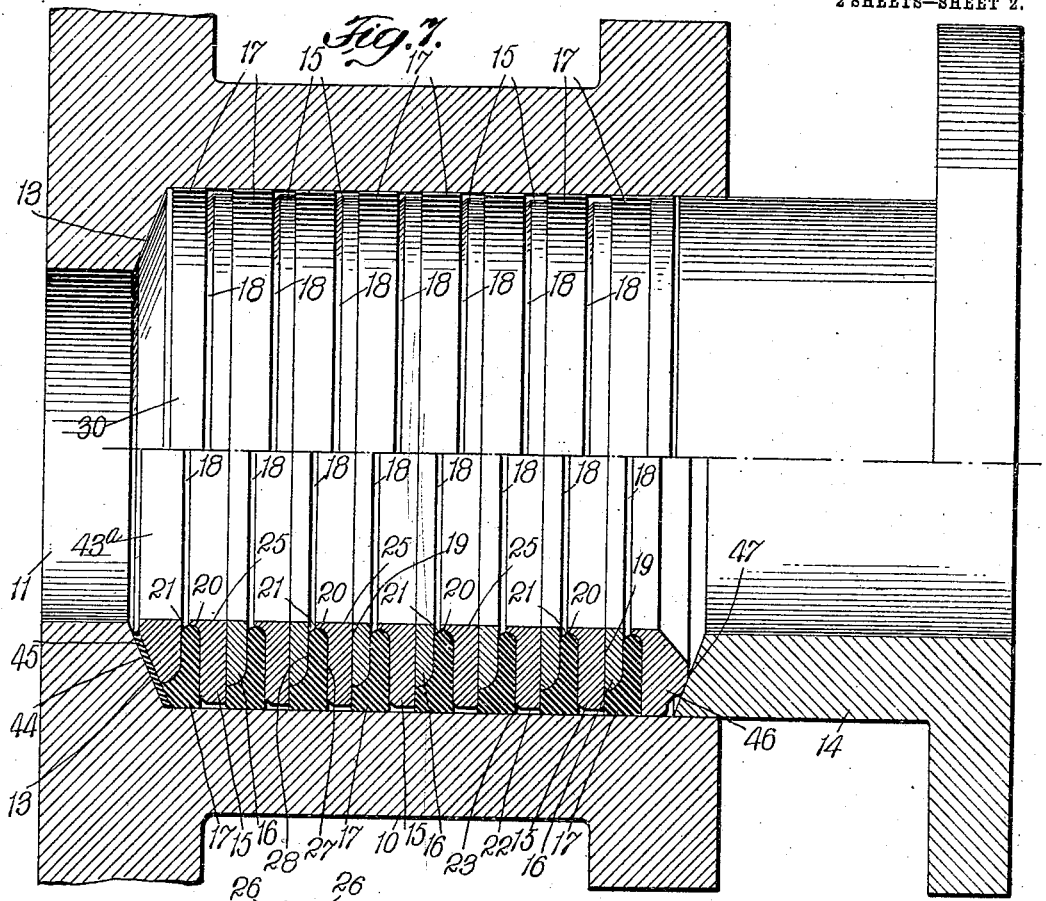
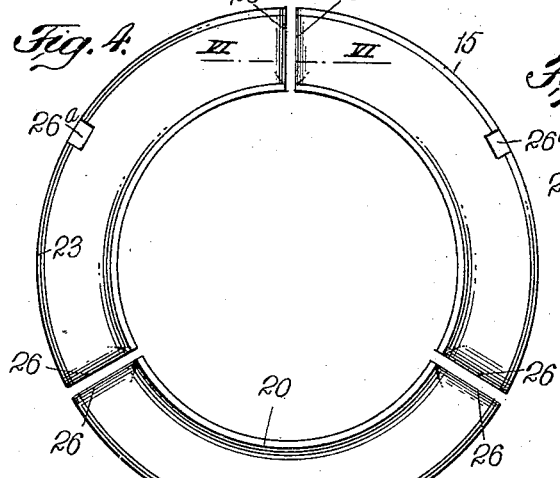
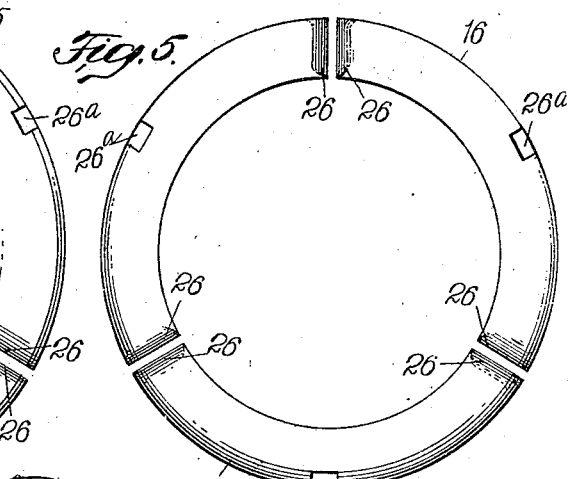
WITNESSES
INVENTOR
Harry Brousseau
BY
Criswell & Criswell
ATTORNEYS

UNITED STATES PATENT OFFICE.

HARRY BROUSSEAU, OF NEW YORK, N. Y., ASSIGNOR OF ONE-HALF TO MARCUS STERN, OF NEW YORK, N. Y.

PACKING.

951,175.  Specification of Letters Patent.  Patented Mar. 8, 1910.

Application filed May 12, 1909. Serial No. 495,483.

*To all whom it may concern:*

Be it known that I, HARRY BROUSSEAU, a citizen of the United States, and a resident of New York, county and State of New York, have invented certain new and useful Improvements in Packings, of which the following is a full, clear, and exact description.

This invention relates more particularly to a semi-metallic packing adapted for use in connection with the piston rods of steam engines.

The primary object of the invention is to provide a packing in which the metallic or non-compressible members are arranged in pairs and of relatively different diameters, and so constructed that a soft or compressible member interposed between each pair of metallic members will form a continuous and tight joint between the members so that the steam will not leak or escape past the same, which packing may be made to compensate for the wear of the rod or of the rings in connection with which the packing is used, and which packing permits a single ring or member of soft material to be employed between each pair of metallic rings, thus overcoming many of the objections incident to packings of this kind as ordinarily constructed.

Other objects of the invention are to so construct the non-compressible members of the packing that the smaller of each pair may be quick-adjusting to adapt the same to adjust readily to a scored or cut rod, and to have the larger rings or members act more slowly in their adjustment; to so construct the metallic members, as well as the soft members, that the metallic members cannot roll or cant while in use; and to provide means whereby the soft packing members cannot come in contact with the rod, and which are so held that the soft members will not prevent the metallic members or rings from being properly adjusted to compensate for wear.

Another object of the invention is to provide means whereby the packing may be fitted properly and held at the proper angle within a stuffing box about a piston rod or movable element without taking into consideration the angle of the bottom of the stuffing or packing box, which usually varies in different engines and other machines employing a packing.

A further object of the invention is to provide means whereby the packing will be held in its proper relation with respect to the rod, and the packing so held that it will not be displaced in case the packing gland should become loose.

A still further object of the invention is to provide a packing which may be used for various purposes and in various connections.

With these and other objects in view, the invention will be hereinafter more particularly described with reference to the accompanying drawings, which form a part of this specification, and will then be pointed out in the claims at the end of the description.

In the drawings, Figure 1 is a longitudinal section of one form of packing embodying my invention, showing the same applied to a packing or stuffing box. Fig. 2 is an elevation of the bottom ring or member of the packing. Fig. 3 shows one form of joint for the parts of the bottom ring or member shown in Fig. 2. Fig. 4 is a detail view of one of the metallic rings or non-compressible members. Fig. 5 is a detail elevation of one of the smaller metallic rings or non-compressible members. Fig. 6 is an enlarged transverse section taken on the line VI—VI of Fig. 4; and Fig. 7 shows a construction having different forms of end rings or members.

The packing or stuffing box 10 may be provided with an opening 11 for the passage of a piston or other rod 11$^a$, and has a packing chamber 12, the bottom or inner portion of which may be beveled or inclined, as at 13, and at the forward part of the chamber 12 is a suitable packing gland 14 which may be held to the stuffing box 10 by means of bolts or otherwise as is usual in devices of this kind, all of which parts may be of the usual or of any preferred construction.

A series of rings 15 of metal or other non-compressible material are arranged within the box or casing 10, and coöperating with each ring 15 is a similar ring 16 of smaller diameter. These rings 15 and 16 are arranged in pairs, and between each pair is a packing ring or member 17 of rubber or other soft or compressible material which holds each pair of rings separated by a space 18 from the pair adjacent thereto to permit proper compression of the rings or members 17. Each of the rings 15 and 16 comprises a plurality of parts to adapt the same to be readily placed over the piston or other rod, and the joints of the parts of each ring 15 are made to break or be spaced so that they will not come into alinement with the spaces between the parts composing the ring 16 with which it coöperates. The rings 15 and 16 are of relatively different diameters and each have a straight abutting surface 19, which forms a substantial bearing to hold the same properly with relation to the rod. The rings 15 are each provided with a curved part 20 at the inner part thereof, forming a rib or compression part around the ring, and this rib is adapted to be engaged by the inner end 21 of the soft packing ring 17, and said ring 16 is somewhat smaller than the diameter of the chamber 12 so as to provide a space 22 to allow for any motion caused by the rod being out of alinement, and each ring 15 is provided with an outer beveled part 23 to allow the soft packing to engage the same when compressed and in connection with the compression part 20 to force the same inward against the rod. Each ring 16 has a curved outer edge or compression part 24, and said ring is somewhat narrower than the ring 15 with which it coöperates, and said curved part 24 of each ring 16 gives a somewhat greater bearing surface for the soft ring 17 than the part 20 of ring 16, which soft ring 17 is concaved to conform to the shape of the periphery of the smaller ring 16, so that said soft ring when compressed will adjust and force the metallic ring 16 against which it acts against the rod to cause the same to quickly adjust itself to any unevenness of the rod whether by scoring, cutting or otherwise in order that a proper and tight joint may be quickly secured. By forming the part 20 in the shape of a rib a certain distance away from the inner bearing surface 25 of the rings 15, the packing 17 will be held away from the rod so that it cannot come in contact with the same, as soft packing and particularly rubber usually contains ingredients of a more or less gummy nature which injuriously affects the rod.

The rings 15 and 16 each have the surface rounded, as at 26, where the rubber or other soft packing comes in contact therewith, and particularly at the joints of the parts forming each ring so that the soft packing may be properly compressed without the packing entering the space between the part of each ring sufficiently to prevent the rings from moving toward each other, otherwise the rings could not be adjusted to permit the same to be forced against the rod as the parts wear. Each of the rings 15 and 16 have recesses 26$^a$ at its edge for the soft packing to enter to prevent rolling or rotary motion of said rings around the rod so that the only movement is radial thereby permitting proper adjustment of the rings. The rubber or soft rings 17 are substantially L-shaped in cross-section, and said rings have less bearing surface against the faces of the rings 16 than it has against the face of the rings 15. That is the members 15 each have a surface or contact face 27 of greater extent than the surface or contact face 28 of each of the rings 16, and the contact surfaces, by reason of similar surfaces on the soft rings 17 serve as a means for holding the metallic rings 15 from bearing too heavily against the rod. It will be seen that the soft packing rings 17 each have a face 29 which bears against one of the abutting surfaces 19 of the ring 15 with which it coöperates and in this way overlaps the joints of both rings of each pair and provides an effective and tight joint. These rings 17 may be made of a single portion of packing and may be split at one point to permit the same to be forced over the piston rod, and by constructing the rings 17 as shown the metallic rings will have relatively different adjustments both in extent and time and said rings will be held to avoid canting or tilting of the same, so that they will wear properly and evenly with the rod and at the same time each soft ring is prevented from coming in contact with the rod.

To provide means for holding the packing properly within the box and also to avoid the necessity for considering the nature or character of the bottom of the box, as for example, the bottom 13, and to permit the bottom to be placed or located at any desired point in the box, I provide a bottom ring or element 30. This element, Figs. 1 and 2, may be variously formed. As shown it has its periphery adapted to fit into locking engagement with the entire bore or surface of the chamber 12, and said ring or element is split or cut, as at 31, and may be cut or grooved, as at 32, at a point opposite the split part 31, and these cuts or grooved parts 32 need not be formed so as to extend entirely through the ring. By leaving a small part, as at 33, and then breaking the ring at this point, an irregular part is provided which forms a neat and properly fitting joint for the parts 34 and 35 of said ring or member 30. At the split part 31, a tapered and threaded opening is provided, and in this opening is a tapered screw 36 which is adapted to force the members 34 and 35 apart in order to fit snugly and tight within the chamber 12 and in any desired location within the same. The face of the members of the ring or element 30 are made true with respect to the periphery 37 of said ring, and said ring has its face 38 made to conform to the shape of the surface of the soft ring 17 which abuts against the same. This ring 30 has its bore somewhat larger than the rod so that it does not come in contact with the same, and the purpose of this ring or element is to provide a false or adjustable bottom for the box, and by having its face properly squared and true will hold the rings comprising the packing in their proper relation with respect to the rod.

A ring or element 39 is arranged at the forward part of the box and may be termed the finishing ring, and this ring is somewhat similar in construction to that of the ring or element 30 so far as comprising two members, and to be made adjustable and locked within the box or casing by means of a screw 40, which serves to force members of the ring or element apart. This ring is also somewhat larger than the rod so as not to come in contact therewith, and is provided with a centering or straight bearing surface 41 in order that the beveled surface or end 42 of the gland 14 will tend to force the score inward in a direct line and not sidewise, and by having the said ring or element locked within the box, the packing rings 15, 16 and 17 will still be held in proper position and make a tight joint even should the gland become loose from any reason whatever.

In Fig. 3, the members of the ring 30 or the ring 39, is cut entirely through and not broken as shown in Fig. 2, and the two members form a pivotal connection, as 43, in such a way that the members may be readily spread apart.

In Fig. 7 the construction so far as the rings 15, 16 and 17 are concerned, are exactly the same as shown in Figs. 1, 4, and 5, and instead of the ring 30 forming the bottom of the box, a ring or element 43$^a$ is provided, and this ring may comprise a plurality of parts to adapt the same to be placed about the piston rod, and said ring has its inner face beveled, as at 44, to engage a packing ring of soft material 45, as rubber, which is adapted to fit against the surface 13 of the packing box. The outer or finishing ring 46 is provided with a bearing part 47 to center the various rings comprising the packing by causing the packing gland 14 to properly engage the part 47.

It will be understood that the rings may be constructed to move outward in their adjustment instead of inward and in such case may be used for pistons or in other connections, and that instead of the metallic rings, fiber may be used in some cases as the non-compressible elements or rings.

From the foregoing it will be seen that a simple and efficient packing is provided, which may be readily made and assembled; that said packing has its rings so constructed and its metallic or non-compressible members arranged in pairs so that a single soft ring may be made to form a continuous joint between said non-compressible rings of each pair; that said rings cannot roll or cant on account of the bearing surface of soft packing and the surfaces of the metallic rings; that the rubber or other soft packing by engaging the compression curve or part of one of the rings of each pair prevents the rubber or soft packing from coming into contact with the rod; that the joints between the parts of each ring are so formed that the soft packing cannot prevent the rings from moving toward each other to compensate for wear; that by making the metallic rings in the manner shown and having the same coöperating with the soft packing rings, the said rings will have relatively different adjustments so that one set of rings will be adjusted more quickly than the other set; and that the packing may be used for various purposes and in various connections.

Having thus described my invention, I claim as new and desire to secure by Letters Patent:—

1. A packing of the character described, comprising a plurality of rings arranged in pairs and provided with compression surfaces of relatively different extent and means whereby one ring of each pair may be forced inward faster than the other.

2. A packing of the character described, comprising a plurality of rings arranged in pairs and provided with compression surfaces of relatively different extents, and a compressible packing ring arranged between each pair and engaging the compression surfaces whereby one ring of each pair may be forced inward faster than the other.

3. A packing of the character described, comprising a plurality of metal rings of relatively different wearing surfaces and arranged in pairs, and means for forcing one of the rings of each pair faster than the other.

4. A packing of the character described, comprising a plurality of metal rings of relatively different wearing surfaces and arranged in pairs, and a soft packing ring arranged between each pair and engaging both rings of one of the pairs for forcing one of the rings of each pair faster than the other and forming a sealing joint when the rings are adjusted.

5. A packing of the character described, comprising a plurality of rings arranged in pairs and having relatively different compression surfaces as compared to relatively-different wearing surfaces, and means arranged between each pair adapted to impart a faster movement to one ring of each pair than the other.

6. A packing comprising a plurality of metallic rings arranged in pairs, and means whereby one ring of each pair may be moved faster than the other.

7. A packing comprising a plurality of metallic rings arranged in pairs, and means whereby the rings may be moved simultaneously but one ring of each pair faster than the other.

8. A packing having a plurality of pairs of non-compressible members of relatively different diameters and having abutting faces, and a soft packing member interposed between each pair and bearing against the back of one of the rings and against the abutting face of the larger ring whereby an effective seal is obtained and at the same time permitting relative adjustments of the rings of each pair.

9. A packing having a plurality of pairs of non-compressible members of relatively different diameters and having abutting faces and relatively different compression surfaces, and a soft packing member interposed between each pair and bearing against the back of one of the rings and against the abutting face of the larger ring and against the compression surfaces whereby an effective seal is obtained and at the same time causing one of the rings of each pair to be adjusted faster than the other.

10. In a packing, the combination with a box having a packing chamber for the passage of a rod therethrough, of a packing arranged within said chamber and comprising a ring member adapted to form the bottom of the box and to engage and be locked within the packing chamber, a plurality of pairs of rings of relatively different diameters having a straight abutting surface to adapt each ring to be partly supported by its abutting member, said rings being spaced apart, a soft packing member interposed between each pair of rings and having a bearing of relatively different extent against the rings of the opposed pairs, each soft ring being so constructed as to have a bearing against both rings or each pair to form a seal and to so engage the rings as to impart a relatively different movement to the same to adjust the members to fit the rod, and a finishing ring adapted to fit into and be locked within the chamber to hold the rings in their proper position within the box.

11. In a packing, the combination with a box having a packing chamber for the passage of a rod therethrough, of a packing arranged within said chamber and comprising a ring member adapted to form the bottom of the box and to engage and be locked within the packing chamber, a plurality of pairs of rings of relatively different diameters having a straight abutting surface to adapt each ring to be partly supported by its abutting member, said rings being spaced apart, and a soft packing member interposed between each pair of rings and having a bearing of relatively different extent against the rings of the opposed pairs.

12. In a packing, the combination with a box having a packing chamber for the passage of a rod therethrough, of a packing arranged within said chamber and comprising a ring member adapted to form the bottom of the box and to engage and be locked within the packing chamber, and a plurality of packing rings.

13. In a packing, the combination with a box having a packing chamber for the passage of a rod, of a packing arranged within said chamber and comprising a ring member formed of a plurality of parts adapted to form the bottom of the box and to engage and be locked within the packing chamber, a plurality of pairs of non-compressible rings, and compressible rings interposed between the pairs of non-compressible rings.

14. In a packing, the combination with a box having a packing chamber for the passage of a rod, of a packing arranged within said chamber and comprising a ring member adapted to form the bottom of the box and to engage and be locked within the packing chamber, a plurality of pairs of rings having a straight abutting surface to adapt each ring to be partly supported by its abutting member, said pairs of rings being spaced apart, and a soft packing member interposed between each pair of rings and having a bearing of relatively different extent against the rings of the opposed pairs, and a finishing ring adapted to fit into and be locked within the chamber to hold the rings in their proper position within the box.

15. In a packing, the combination with a box having a packing chamber for the passage of a rod, of a packing arranged within said chamber and comprising a plurality of pairs of rings having abutting surface to adapt each ring to be partly supported by its abutting member, said pairs of rings being spaced apart, a soft packing member interposed between each pair of rings, and a finishing ring adapted to fit into and be locked within the chamber to hold the rings in their proper position within the box.

16. The packing of the character described, having a ring adapted to form the bottom of a box, said ring comprising a plurality of members, and means for spreading the members apart to adapt the same to be locked within the box.

17. A packing of the character described, comprising a ring adapted to form the bottom of a box, said ring comprising a plurality of members and a screw for spreading the members apart to adapt the same to be locked within the box, and a plurality of compressible and non-compressible rings.

18. A packing for piston rods and the like, comprising a ring adapted to form the bottom of a box, said ring comprising a plurality of members and means for spreading the members apart to adapt the same to be locked within the box, a plurality of metallic and soft rings, and a finishing ring also comprising a plurality of members having means for adjusting the same to lock the ring within a box.

19. A packing, comprising a plurality of metallic and soft rings, and a finishing ring comprising a plurality of members having means for adjusting the same to lock the ring within a box.

20. A packing comprising a ring adapted to form the bottom of a box, said ring comprising a plurality of members and a tapered screw for spreading the members apart to adapt the same to be locked within the box, and a plurality of non-compressible and rubber rings.

21. A packing of the character described, comprising a plurality of rings of relatively different diameters and arranged in pairs, one of which is provided with a curved compression surface at or near its inner portion, and the other with an outer and greater compression surface, and a ring of soft compressible material interposed between each pair and adapted to force one ring of each pair inward faster than the other.

22. A packing of the character described, comprising a plurality of rings of relatively different diameters and arranged in pairs, one of which is provided with a curved compression surface, and the other with a greater compression surface, and compressible material interposed between each pair and adapted to force one ring of each pair inward faster than the other.

23. A packing of the character described, comprising a plurality of rings arranged in pairs, and provided with compression surfaces of relatively different extents, and a ring of soft compressible material interposed between each pair and adapted to force one ring of each pair inward faster than the other.

24. A packing of the character described, comprising a number of pairs of non-compressible rings one ring of each pair being provided with a compression part, and a plurality of rings of soft material arranged between the pairs of rings and having a part thereof adapted to engage the compression part to limit the movement of said soft rings in one direction.

25. The combination with a packing box having a packing chamber therein, of a plurality of metallic rings arranged in pairs and each of less diameter than the chamber of the box, the said rings being of relatively different diameters and one of said rings having a compression inner rib and an outer beveled edge with an extended bearing surface, the other metallic ring being provided with a compression periphery and a bearing surface of less extent than the other ring, and a substantially L-shaped packing ring interposed between each pair of metallic rings and having a relatively different bearing and engaging surface between the rings with which it engages to cause the rings to have a variable speed of adjustment when the soft rings are compressed.

26. A packing comprising a plurality of metallic rings arranged in pairs and of relatively different diameters, one of said rings of each pair having a compression inner rib and an outer beveled edge with an extended bearing surface, the other metallic ring being provided with a compression periphery and a bearing surface of less extent than the other ring, and a substantially L-shaped packing ring interposed between each pair of metallic rings and having a relatively different bearing and engaging surface between the rings with which it engages to cause the rings to have a variable speed of adjustment when the soft rings are compressed.

27. A packing comprising a plurality of non-compressible rings arranged in pairs, one of said rings having a compression rib and a beveled edge with an extended bearing surface, the other ring being provided with a compression part and a bearing surface of less extent than the other ring, and a compressible packing ring interposed between each pair of non-compressible rings and having a relatively different bearing and engaging surface between the rings with which it engages.

This specification signed and witnessed this 8th day of May A. D. 1909.

HARRY BROUSSEAU.

Witnesses:
M. F. KEATING,
M. DINNHAUPT.